United States Patent [19]
Davis

[11] 3,797,462
[45] Mar. 19, 1974

[54] DOG STANCHION FOR AUTOMOBILES

[76] Inventor: Gary A. Davis, 6353 Monitor Ln., Indianapolis, Ind. 46220

[22] Filed: May 29, 1973

[21] Appl. No.: 364,973

[52] U.S. Cl. .............................. 119/96, 224/29 D
[51] Int. Cl. .............................................. B60r 7/04
[58] Field of Search .............. 119/1, 96; 5/94, 118; 224/29 D, 42.42 R, 42.42 A, 42.43, 42.44, 42.45 R, 42.45 A, 42.45 B; 297/217, 232, 250, 251, 257, 463; 280/150 R, 150 B

[56] References Cited
UNITED STATES PATENTS
1,872,740  8/1932  James .............................. 5/118 X Primary Examiner—Antonio F. Guida
Assistant Examiner—J. A. Oliff
Attorney, Agent, or Firm—Woodard, Weikart, Emhardt & Naughton

[57] ABSTRACT

Disclosed is stanchion for stabilizing medium or large size dogs riding in a passenger automobile. The stanchion has spaced side panels spanned by a transverse member at the panels' front end. The panels have support legs of adjustable length which diverge outwardly, and extending sidewardly and outwardly from each panel is a telescoping U-shaped bracing member which is spring loaded to a maximum extended position. The bracing members engage the sidewalls of the automobile in which the stanchion is installed.

3 Claims, 4 Drawing Figures

DOG STANCHION FOR AUTOMOBILES

BACKGROUND OF THE INVENTION

Dogs, particularly medium and larger sized, have difficulty maintaining their footing while riding freely in automobiles. Repeated acceleration, braking and sharp turns tend to project the dog, sometimes quite forcefully, about the interior of the automobile. The difficulty can be reduced by confining the dog in a relatively small pen or cage, however, this solution has not been entirely satisfactory.

The stanchion of the present invention serves to stabilize the dog in a standing position providing side and front bracing surfaces. The dog may be tied, at his collar, in the stanchion, however, after several rides using the stanchion, typing the dog usually becomes unnecessary because the dog welcomes the stabilizing support. The extending bracing members have a hinged connection to their respective side panel frames so that they can be folded into parallel relation with the side panels for storage of the assembly.

DESCRIPTION OF THE PREFERRED EMBODIMENT

Figure 1:
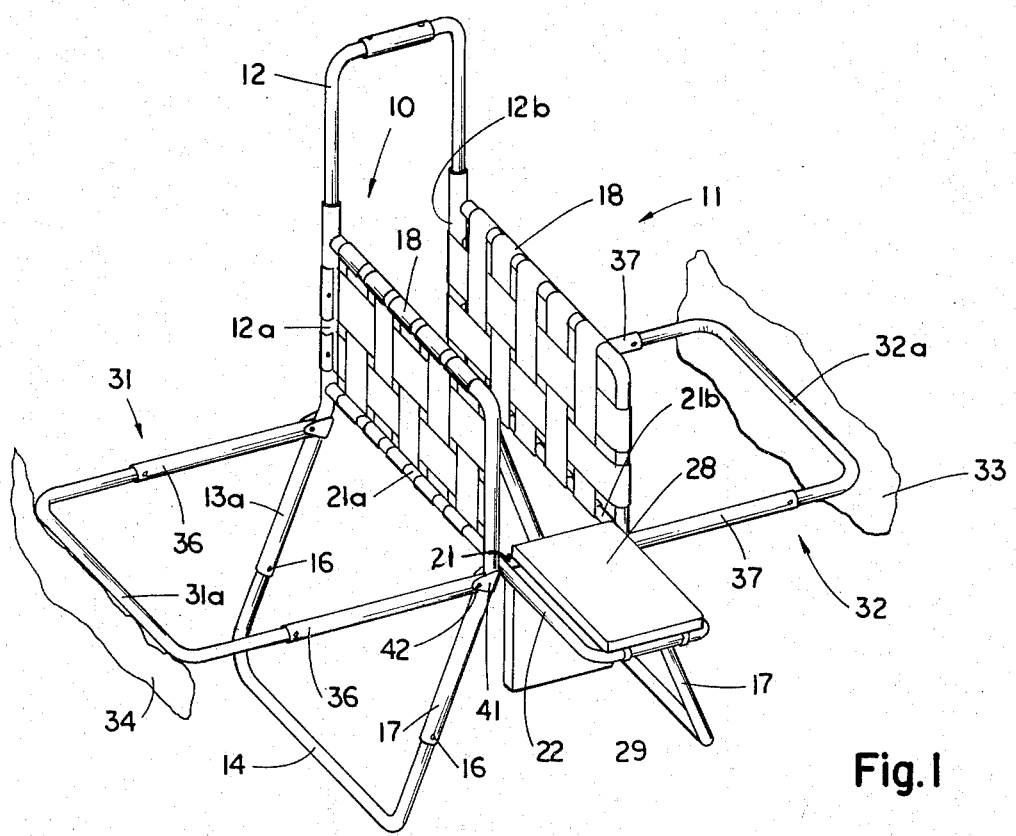
FIG. 1 is a perspective view of the stanchion taken generally from the front of the assembly.
Figure 2:
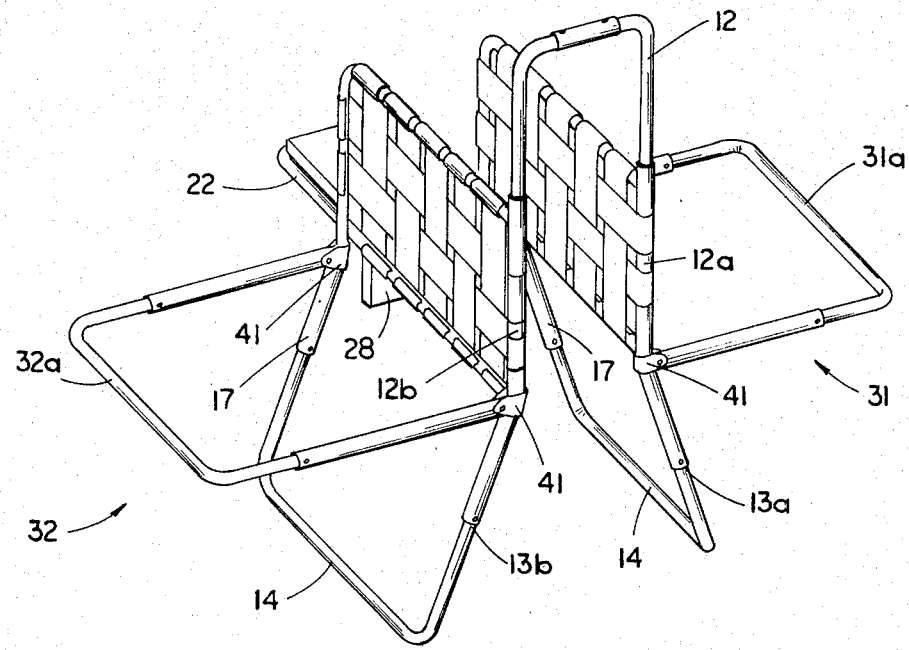
FIG. 2 is a perspective view of the assembly taken generally from its rear.

Referring to FIGS. 1 and 2, the stanchion assembly of the present invention includes parallel spaced side panels indicated generally at 10 and 11. The side panels are formed by a rigid frame, preferably of tubular aluminum. The frame has a generally inverted U-shaped member 12 at its rear and the lower portion of this member 12 indicated at 12a and 12b provide the rear side margins of the side panels 10 and 11. As may best be seen in FIG. 2, the member 12 extends below the portions 12a and 12b to provide outwardly inclined support legs 13a and 13b respectively. The legs 13a and 13b are not integrally formed but are a composite of the telescoping tubular end of the member 12 and the U-shaped member 14. A screw 16 which extends transversely through the telescoping members, by means of alternate screw accommodating holes, permits the length of legs 13a and 13b to be adjusted.

As may best be seen in FIG. 1, the U-shaped members 14 also telescopically engage the outwardly extending ends 17 of side frame members 18. The members 18 are rigidly attached by any suitable means to the downwardly extending side portions of the member 12. The telescoping portions of the members 14 and 17 are also adjustable by means of alternate apertures (not shown) receiving the transverse screws 16 in identical fashion to that described with reference to legs 13a and 13b.

A transverse member 21 spans the space between the side panels 18 and is rigidly secured to a U-shaped tubular member 22 whose closed end extends frontwardly beyond the transverse member 21 and whose rear portions 21a and 21b are rigidly secured to the portions 12a and 12b of the member 12, respectively.

Figure 3:
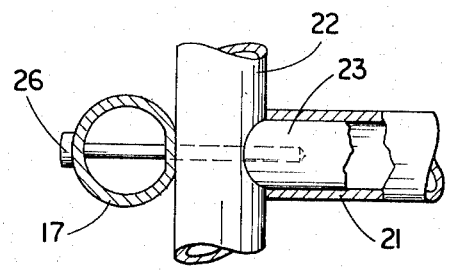
FIG. 3 is an enlarged fragmentary view of a portion of the assembly shown in FIGS. 1 and 2.

One means for rigidly securing the transverse member 21 to the side portions of the member 22 and to the vertical portions of the members 17 (forming the front end margins of the panels 18) is illustrated in FIG. 3. A through member 26 extends through an aperture in the vertical portion of the member 17 and through an aperture in the side portions of the member 22. The member 26 is threaded into a solid, cylindrical plug 23 which is sized to fit tightly within the tubular member 21. Tightening the member 26 into the threaded portion of the plug 23 serves to draw the adjacent frame members tightly together. It will be understood that other means for joining these members might also be utilized. The side panels 18 are given a slight resiliency by weaving plastic strips over the adjacent frame portions, the plastic strips being of the conventional variety used for lawn chair webbing. A cushion or pad 28, by means of spring clips 29, is secured to the front portion of the member 22 and extends in overlying relation to the transverse member 21 and depends therefrom. The cushion thus forms a horizontal surface and a depending vertical surface which cushions the front shoulder area and the neck and jaw area of a dog accommodated within the stanchion.

Figure 4:
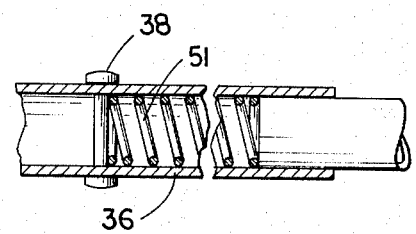
FIG. 4 is an enlarged, sectional view of a further portion of the assembly shown in FIGS. 1 and 2.

The assembly is completed by identical bracing members 31 and 32 which extend sidewardly and outwardly of each of the panels 18 and are generally U-shaped, with the base 31a and 32a of the members 31 and 32 engaging the sidewalls of the vehicle in which the apparatus is installed, a fragment of such sidewall being indicated at 33 and 34 in FIG. 1. The members 31 and 32 are formed by U-shaped member (whose base portion is indicated at 31a and 32a) which telescope within tubular members 36 and 37 respectively. The members 36 and 37 are pivotally attached to the adjacent portions of the members 17, 13a and 13b by means of straps 41 which are secured to the adjacent frame members and are provided with outwardly extending ears which receive pins 42 which extend through and provide the pivotal mounting for the adjacent members 36 and 37. The straps 41 as will be evident from both FIGS. 1 and 2 are disposed at the junction of the vertical panel frame members 12a and 12b with the outwardly inclined portions 13a and 13b and, similarly, at the opposite end of the assembly. The members 31 and 32 thus, when free, drop into the general position shown in FIGS. 1 and 2 but may be pivotally moved upwardly to fold the members 31 and 32 into general parallel relation with the side panels 18 for storage of the assembly. The U-shaped members, whose base is indicated at 31a, are spring loaded to a maximum extended position by means of compression springs 51, one of the springs being shown in detail in FIG. 4. The springs extend within the members 36 (and on the other side, members 37) and bottom against a transverse pin 38 which extends through the member 36. The other end of the compression spring 51 engages the end of the U-shaped member and functions to extend it for the unstressed length of the spring outwardly from the members 36. This permits the portions 31a and 32a to be moved, within limits, inwardly toward the panels so that the stanchion can be accommodated in automobile bodies of various widths. Manually moving the portion 31a and 32a toward the center of the assembly also aids in removing and installing the stanchion in an automobile.

In operation the stanchion may be positioned on a supporting surface such as the floor or seat of an automobile with the outwardly extending legs engaging the supporting surface. The bracing members 31 and 32 extend outwardly to engage the sides of the automobile. The dog may be positioned laterally between the side panels 18 with his front shoulder area generally contacting the transverse member 21 and the depending portion of the pad 28. The horizontal portion of the pad may act as a cushion for the underside of the dog's head and, if necessary, the dog may be tied, by its conventional collar, in place within the stanchion. The generally V-shaped or outwardly extending configuration of the legs 17 and 13a and 13b permit the dog to sit down within the stanchion.

I claim:

1. A stanchion for dogs which is adapted for use in automobiles comprising: a rigid frame which includes parallel spaced side panels having downwardly extending and outwardly inclined support legs of adjustable length adapted to rest against a supporting surface, a transverse member spanning the space between the side panels for engaging the front shoulder area of a dog positioned laterally between said side panels, and a bracing member extending sidewardly from each of said panels for laterally steadying the stanchion by engaging the adjacent sidewalls of the automobile in which the stanchion is installed, each of said bracing members being extensible in length and spring loaded to maximum extended position to permit the stanchion to be removably accommodated in automobiles of various sidewall spacing.

2. A stanchion as claimed in claim 1 in which a head rest member extends horizontally forward from said transverse member, and a unitary cushion overlies said head rest and transverse members and depends downwardly from said transverse thereby cushion the shoulder area and head of a dog accommodated in the stanchion.

3. A stanchion as claimed in claim 1 in which said bracing members extend from the junctional area of said side panels with their respective support legs, said bracing members each being formed by a U-shaped tubular member having spring-loaded telescoping legs, the base portion of the U-shaped members being adapted to engage the automobile sidewalls.

* * * * *